(12) United States Patent
Radu

(10) Patent No.: US 10,081,424 B2
(45) Date of Patent: *Sep. 25, 2018

(54) FLYING CAR OR DRONE

(71) Applicant: Bogdan Radu, Shelton, CT (US)

(72) Inventor: Bogdan Radu, Shelton, CT (US)

( * ) Notice: Subject to any disclaimer, the term of this patent is extended or adjusted under 35 U.S.C. 154(b) by 692 days.

This patent is subject to a terminal disclaimer.

(21) Appl. No.: 14/585,988

(22) Filed: Dec. 30, 2014

(65) Prior Publication Data

US 2016/0272314 A1  Sep. 22, 2016

Related U.S. Application Data

(60) Provisional application No. 61/922,754, filed on Dec. 31, 2013.

(51) Int. Cl.
*B64C 37/02* (2006.01)
*B64C 37/00* (2006.01)
(Continued)

(52) U.S. Cl.
CPC ............. *B64C 37/00* (2013.01); *B60F 5/02* (2013.01); *B60K 6/20* (2013.01); *B64C 29/0033* (2013.01);
(Continued)

(58) Field of Classification Search
CPC ..... B64C 37/00; B64C 3/56; B64C 2201/027; B64C 2201/042; B64C 2201/206; B64C 29/0033; B64C 2201/108; B64C 2201/024; B64C 2201/165; B64C 2201/12; B64C 39/08; B64C 2201/126; B64C 2201/162; B64C 2201/208; B64C 39/04; B64C 11/001; B64C 27/08; B64C 27/22; B64C 27/52; B64C 39/028; B64C 11/00; B64C 27/02; B64C 27/20; B64C 27/28; B64C 27/32; B64C 27/50; B64C 3/48; B64C 1/063; B64C 1/30; B64C 2025/325; B64C 2201/20; B64C 2211/00; B64C 25/04; B64C 25/405; B64C 27/00; B64C 27/04; B64C 27/16; B64C 29/0016; B64C 29/0075; B64C 39/003; B64C 9/00; B60F 5/02

See application file for complete search history.

(56) References Cited

U.S. PATENT DOCUMENTS 1,718,577 A  6/1929  Pitcairn
2,423,095 A  7/1947  Gibson
(Continued)

FOREIGN PATENT DOCUMENTS

WO  WO 2013181722 A2 * 12/2013 ............. B60K 16/00
WO  WO 2014144001 A2 *  9/2014 ................ B60F 5/02

*Primary Examiner* — Matthieu F Setliff
*Assistant Examiner* — George Andonyan
(74) *Attorney, Agent, or Firm* — Davis & Bujold PLLC; Michael J. Bujold

(57) ABSTRACT

A vehicle which can travel on land, in water, or through air has a body like that of an automobile with powered wheels for providing propulsion on land. The vehicle also has rotors for providing propulsion in air and wings for providing lift. Storage compartments conceal the rotors during land operation, and in this mode the wings are folded down against the body, over the compartments. The wings and the rotors can be deployed to convert the vehicle to flight mode.

4 Claims, 22 Drawing Sheets

(51) Int. Cl.
  *B64C 29/00* (2006.01)
  *B60F 5/02* (2006.01)
  *B60K 6/20* (2007.10)
  *B64D 25/00* (2006.01)

(52) U.S. Cl.
  CPC .......... *B64D 25/00* (2013.01); *B60Y 2200/92* (2013.01); *Y10S 903/903* (2013.01)

(56) References Cited

U.S. PATENT DOCUMENTS

| | | | |
|---|---|---|---|
| 2,468,425 A | 4/1949 | Joseph | |
| 2,563,731 A * | 8/1951 | Masterson | B64C 37/00 244/2 |
| 2,713,393 A | 7/1955 | Isacco | |
| 3,065,938 A | 11/1962 | Calkins | |
| 3,162,401 A | 12/1964 | Hopwood | |
| 3,494,575 A | 2/1970 | Budworth | |
| 4,579,297 A * | 4/1986 | Ayoola | B60F 3/00 244/106 |
| 4,685,410 A | 8/1987 | Fuller | |
| 4,824,053 A | 4/1989 | Sarh | |
| 4,856,732 A | 8/1989 | Eickmann | |
| 5,141,173 A | 8/1992 | Lay | |
| 5,360,367 A | 11/1994 | Ho | |
| 5,505,407 A | 4/1996 | Chiappetta | |
| 5,645,250 A | 7/1997 | Gevers | |
| 5,810,638 A | 9/1998 | Wood | |
| 5,890,441 A | 4/1999 | Swinson et al. | |
| 5,915,649 A | 6/1999 | Head | |
| 6,138,943 A | 10/2000 | Huang | |
| 6,517,026 B1 | 2/2003 | Smith | |
| 6,824,095 B2 | 11/2004 | Mao | |
| 6,834,835 B1 | 12/2004 | Knowles | |
| 6,860,449 B1 | 3/2005 | Chen | |
| 7,410,122 B2 | 8/2008 | Robbins | |
| 7,762,500 B1 | 7/2010 | Dhall | |
| 7,789,343 B2 | 9/2010 | Sarh | |
| 7,832,690 B1 | 11/2010 | Levine | |
| 7,866,610 B2 | 1/2011 | Bousfield | |
| 7,938,358 B2 | 5/2011 | Dietrich | |
| 7,959,104 B2 | 6/2011 | Kuntz | |
| 8,210,473 B2 | 7/2012 | Schweighart | |
| 8,220,755 B2 | 7/2012 | Sharp | |
| 8,371,520 B2 | 2/2013 | Easter | |
| 8,453,962 B2 | 6/2013 | Shaw | |
| 8,453,963 B2 | 6/2013 | Liu | |
| 8,827,200 B2 | 9/2014 | Radu | |
| 9,156,550 B2 * | 10/2015 | Nam | B64C 37/00 |
| 9,393,847 B2 | 7/2016 | Piasecki et al. | |
| 9,493,235 B2 * | 11/2016 | Zhou | B60F 5/02 |
| 9,505,282 B2 * | 11/2016 | Hu | B60F 5/02 |
| 2002/0139894 A1 | 10/2002 | Sornesen | |
| 2003/0094537 A1 | 5/2003 | Austen-Brown | |
| 2006/0016930 A1 | 1/2006 | Pak | |
| 2008/0251308 A1 | 10/2008 | Molnar | |
| 2010/0181414 A1 | 7/2010 | Lopez | |
| 2010/0294877 A1 | 11/2010 | Jianu | |
| 2011/0036938 A1 | 2/2011 | Blomeley | |
| 2011/0042507 A1 | 2/2011 | Seiford | |
| 2011/0168834 A1 | 7/2011 | Yoeli | |
| 2011/0192931 A1 | 8/2011 | Jung | |
| 2011/0315806 A1 | 12/2011 | Piasecki | |
| 2012/0048989 A1 | 3/2012 | Eames | |
| 2013/0112804 A1 | 5/2013 | Zhu | |
| 2013/0206919 A1 | 8/2013 | Schachor | |
| 2015/0102155 A1 * | 4/2015 | Krastev | B60K 16/00 244/2 |

* cited by examiner

FLYING CAR OR DRONE

This application claims benefit of provisional patent application No. 61/922,754, filed Dec. 31, 2013.

This invention relates to a vehicle that has a roadable configuration similar to an automobile, wherein multiple rotors are stowed within the vehicle body, and a flying configuration in which the rotors are deployed, allowing the vehicle to take of and fly like a Vertical Take-Off and Landing (VTOL)/Short Take-off and Landing (STOL) aircraft

BACKGROUND OF THE INVENTION

Some aircraft are known, like the V22 Osprey, which have rotors that can tilt, allowing aircraft vertical take-off and landing.

Helicopters' rotors can be tilted within certain limits, which is absolutely essential for their control. Yet, despite having the capability of six degrees of freedom for moving along or rotating around all three axes during flight configuration, helicopters on the ground usually have only very limited mobility, or none at all.

Roadway used by land vehicles are becoming more and more congested due to increased traffic. Traffic congestion creates frustration to those confined to land vehicles, and wastes their time.

Therefore, there is a need for a vehicle for personal transportation that can bypass congested roads, traverse water areas and fly over land or water.

Some prior solutions are disclosed in U.S. Pat. Nos. 5,141,173, 7,959,104, 7,938,358, 8,827,200 4,824,053, 5,645,250, 6,834,835, 7,762,500, 7,789,343, 7,832,690, 7,866,610, 8,220,755, 8,371,520, 2,468,425, 7,938,358, 8,210,473, and publication 2010/0051742. Those documents are incorporated herein by reference.

SUMMARY OF THE INVENTION

The vehicle described herein has (a) a roadable land/amphibious vehicle configuration in which its wheels are powered during ground/water operations, and (b) a flight configuration in which its rotor blades are powered and create air pressure jets that sustain the vehicle in the air, for take off and land maneuvers allowing it to have six degrees of freedom during air operations.

The vehicle also has wings, which serve as rotor compartment covers. In their deployed position, the wings create lift for flight cruise configuration. The main rotors of the vehicle can contain single or multiple propellers. Using multiple propellers powered by independent electrical motors can reduce the size and weight of the rotors.

The mechanical, air, electrical or hybrid systems used for powering the flying car/flying drone vehicle, allow the driver/pilot to selectively switch between an electric drive and an electric drive combined with a combustion engine drive for extended ground travel.

The vehicle has an electric drive vehicle capability, useful for city driving, and is environment friendly and noise and emission free.

The flying car/flying drone vehicle can have a conventionally mounted gasoline or diesel type engine, or can use a turbo-shaft or turbine type engine.

A spark combustion, diesel or turbofan engine is preferably used for extended high speed and high acceleration situations, and could be used for powering a generator for producing electricity for direct use or storage. Alternatively, the engine can power an air compressor. In that case, the compressed air produced is stored in reservoirs or used to drive air motors.

To supplement the generator, for fast charging of the batteries, solar power panels can be attached on the outside top or side areas of the vehicle.

The vehicle of the present invention stores its rotors in a compact configuration inside the vehicle body during the roadable ground mode or during amphibious operations, to minimize the vehicle size and to protect the blades from environmental damage. In its flying mode, the vehicle uses the multiple unfolded rotors to create the necessary lift for take off and helicopter-type maneuvers, while the deployed rotor cover door's wings create lift during cruise maneuvers.

In the flying configuration, additional compressed air jets powered by compressed air can be used to provide additional lift and/or to fine steering control of the vehicle. The compressed air is stored in reservoirs inside the vehicle body. These reservoirs can be recharged by an on-board compressor driven by a combustion engine or electric motor.

For water operations, additional compressed air jets powered by compressed air can be used for additional floatation or propulsion and/or for fine steering control of the vehicle.

The vehicle should be as agile and as maneuverable as possible, like a car or amphibious vehicle, and, like a helicopter, able to move along and around all three axes during flight, thus giving its users the ability to travel anywhere that automobiles and amphibious vehicles can, and also to enter other areas now accessible only by helicopters or airplanes.

The vehicle has a roadable land/amphibious capability as well as an air capability, having also a VTOL/STOL capability. In its flight mode, the vehicle is easy to operate and control. The invention eliminates the complicated construction and operational requirements of helicopters, and is relatively easy to fly.

The vehicle has a high maneuverable capability that is providing an agile road and air transportation. The conversion between road and air transportation modes is simple and can be accomplished in a matter of seconds.

The vehicle also has an electro-mechanical system for deploying the horizontal and vertical controllers, which improve vehicle control and maneuvers during flight operations. The vehicle also has an electro-mechanical system for deploying the telescoping wing extensions, which improve vehicle lift, control and maneuvers during flight operation. Telescoping wings are disclosed, for example, in U.S. Pat. Nos. 4,824,053, 5,645,250, 6,834,835, 7,762,500, 7,789, 343, 7,832,690, 7,866,610, 8,336,830. Hinged wing constructions as shown in U.S. Pat. Nos. 8,220,755 and 8,371, 520. Folding wing constructions are disclosed in U.S. Pat. Nos. 2,468,425, 7,938,358, 8,210,473 and published application 2010/0051742. The disclosures of the above patents are incorporated herein by reference Independently controlling the rotors speeds, or independently changing their blade pitch, can obtain the necessary maneuverability of the vehicle. The flying car/flying drone vehicle can take off or land completely vertical, like a helicopter, or it can take off and land through different ground related angles, like an airplane. During flying mode, the vehicle uses the deployed wings to create the total or partial necessary lift to sustain the vehicle in the air during cruise mode. During cruise, the deployed rotors will rotate with a negative pitch, assuring the necessary trust to fly the vehicle during the cruise configuration.

A primary object of the present invention is to provide a highly maneuverable land, water and air vehicle.

Another object is to provide a compact way of packing and stowing the rotors inside the vehicle body, and to deploy them for flight operations.

An advantage of the invention is that it enables independent control of the individual rotors without complicated mechanical force-distribution couplings.

Another advantage of the invention is that the rotor/propeller can be adapted to current flight conditions or the current airflow speed in the rotor plane, thus improving the performance and efficiency of the rotor/propeller.

Yet another advantage is that the invention enables usage of the side unpacked rotors for an easy flight configuration and enables improved, variable control of the vehicle.

The invention enables the main rotor planes to be fixed in forward flight so as to generate lift, with the rotors/propellers having to generate only thrust.

The main rotor can be fixed during take off and landing configuration or in flight so as to generate lift, with the rotors/propellers having to generate only vertical thrust. During forward cruise flight, the rotors can be given a negative pitch, up to the vertical position (−90° pitch), to provide forward trust to move the vehicle during the vehicle flight cruise configuration.

Because of its brushless motor's configuration, in comparison with frequency-controlled three-phase motors, the invention provides high torque at both low and high rotational speeds. This results in a long service life without excessively high energy storage weights due to the high specific electrical energy.

Another object of the present invention is to provide a rapid configuration change between the air and land water operability of the vehicle.

The vehicle may be used with a remote-controlled system as described below, to provide observation in areas or land or buildings that are difficult to be accessed and/or which present great danger to Special Forces and other operational personnel.

The vehicle may advantageously be used to analyze different ground, water and building areas quietly and precisely, and can also be used to provide an overview from the air or to cover inaccessible search areas.

When equipped with a complete remote-controlled system, the vehicle can analyze, detect or eliminate danger from different areas without requiring human help.

Another object of the invention is to go above and around different obstacles existing in some hard to access or dangerous areas on the battle field.

When used as a part of Special Police or military operations, the vehicle can be used to transport guns, munitions or other necessary equipment.

Another object is to enable special operations to retrieve individual troops or persons from dangerous or not an easy to access areas in the battle field or inaccessible mountains operations.

Another object is to provide a roadable land/amphibious vehicle with the general look of a car, not easily differentiated from other vehicles.

Another object is to provide rotors which are powered mechanically by an internal combustion engine, electrically by rechargeable battery, with air from the air compressed storage reservoirs or by a hybrid type configuration during land, water and air travel.

Another object of this personal type of present invention is that has a general appearance of a land vehicle when moving on the ground and yet can fly in the manner of a helicopter when desired.

A further aspect of the invention is a microprocessor that communicates with vehicle-mounted sensors which can include but are not limited to altitude, accelerometers, radar or gyroscopic sensors. The microprocessor processes such data and actuates the rotors, the rotors' blades or the air jet nozzles accordingly in order to maintain stability during flight.

The invention also provides the vehicle with a compound steering wheel and a steering controller.

The vehicle has brakes and the like that resemble the equipment associated with cars so a driver can operate the vehicle in the manner of a car with which the driver/pilot is familiar.

The vehicle can thus be operated in the manner of a car or amphibious vehicle, but also has the flight capability of a Vertical Take-Off and Landing (VTOL)/Short Take-off and Landing (STOL) aircraft, and thus avoid highway congestion.

The vehicle is designed to be easy to operate on roads, off road, in water and in the air, so it will be attractive to the general public.

The vehicle is designed to be as maneuverable as a regular land vehicle and as agile and as maneuverable as a helicopter so the vehicle can be operated in congested areas while still being safe.

The vehicle can also be used by the airline industry as a shuttle between locations in a single airport, or even between airports.

It is also useful for manned or unmanned operations for rescuing people from, or deploying people to, limited access or dangerous areas.

The above objects of the invention are obtained by the invention described in the following detailed description and the accompanying drawings.

BRIEF DESCRIPTION OF THE DRAWINGS

In the accompanying drawings.

DESCRIPTION OF THE PREFERRED EMBODIMENT

The present invention is embodied in a flying car/flying drone vehicle that operates in the manner of a Vertical Take-Off and Landing (VTOL) or Short Take-off and Landing (STOL) or a helicopter type aircraft, but is sized and designed like a personal land vehicle.

Figure 1:
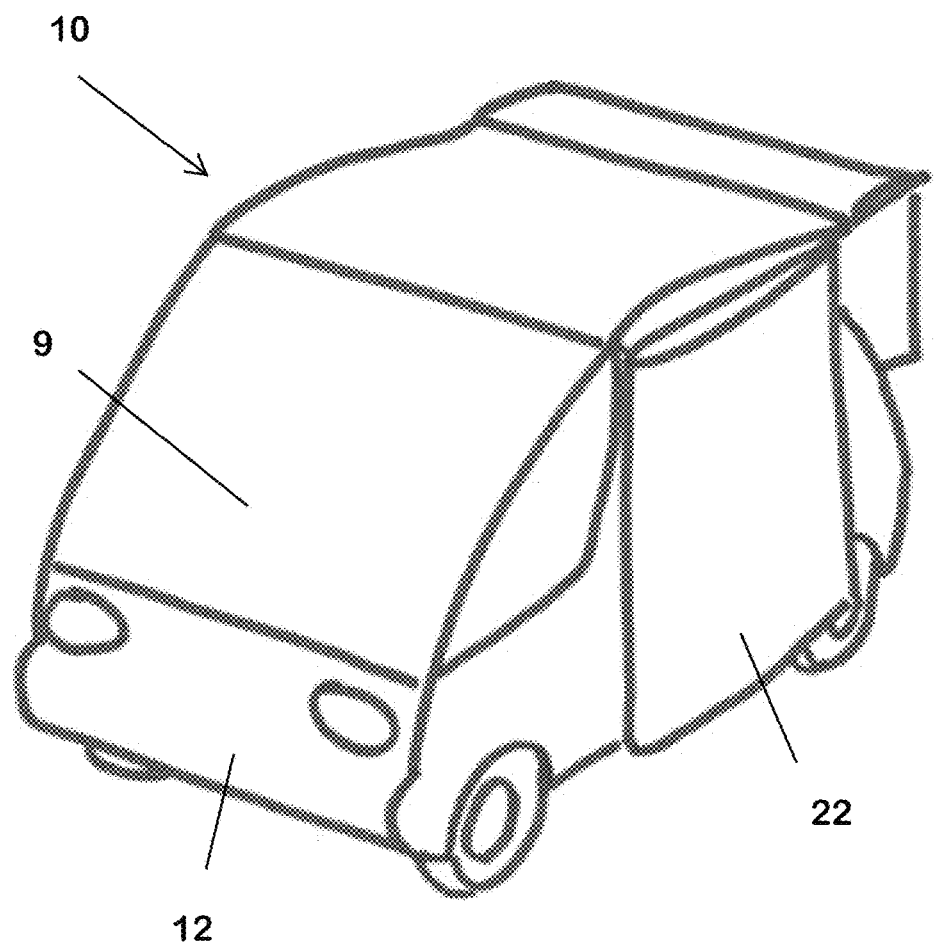
FIG. 1 is a perspective view, from the front of a flying drone or vehicle having a roadable land/amphibious configuration, with its wings folded down to cover stowed rotors.
Figure 2:
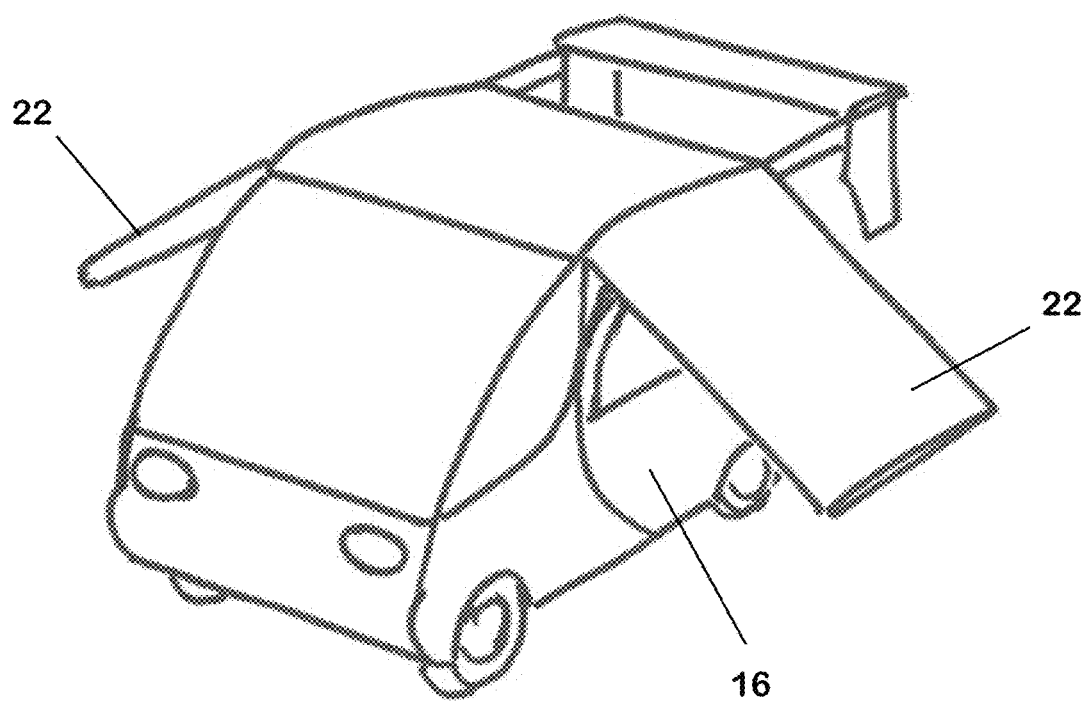
FIG. 2 is a similar view, showing the wings being deployed in a transition configuration.
Figure 3:
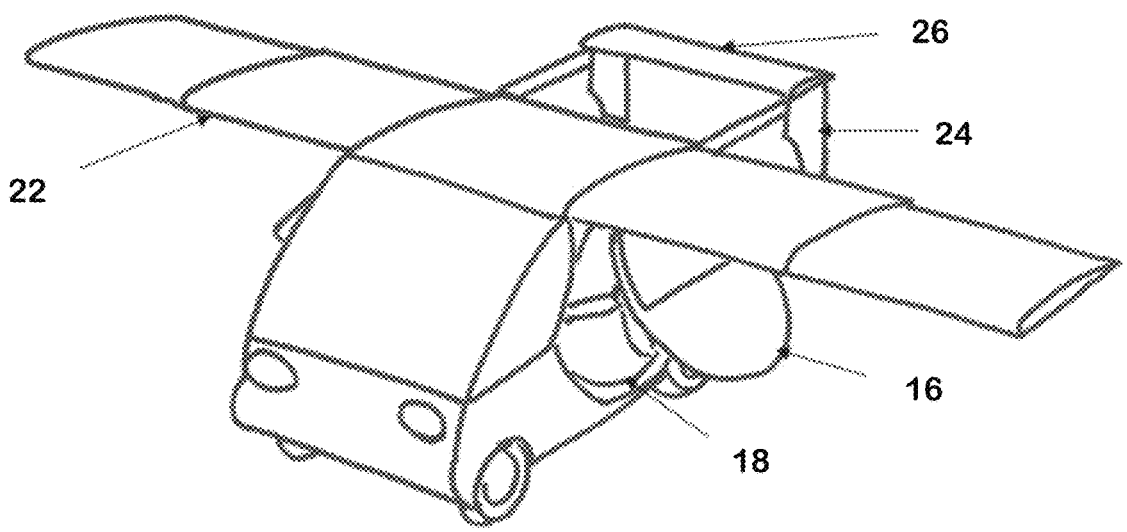
FIG. 3 shows the wings fully deployed and extended, stabilizer extended, and a rotor's cover doors being opened in a transition configuration.

As shown in FIGS. 1 and 3, the vehicle comprises a main body 10 is in the shape of an automobile or an amphibious vehicle and which has a front end 12, a rear end 14 and side storage compartment cover doors 16 which close over storage compartments 18 formed in the sides of the vehicle. The compartments are sized to contain rotors/propellers 20 (hereafter "rotors", FIG. 4), which can be folded into the compartments when not needed. The rotors can open and rotate independently.

A pair of foldable, extensible wings 22 (FIGS. 1-6), which are connected to the main body, also serve as covers for the storage compartments. Folding and extensible wings are well known in the art and therefore their constructional details, which would be a matter of ordinary design skill, are not shown. In their collapsed vertical configuration (FIG. 1), the wings cover the rotors, and provide lift in their flight and cruise configuration (FIG. 3).

The transformation of the vehicle between the land and air configuration can be rapidly done automatically, without operator assistance, as shown schematically in FIGS. 1-12.

Figure 17:
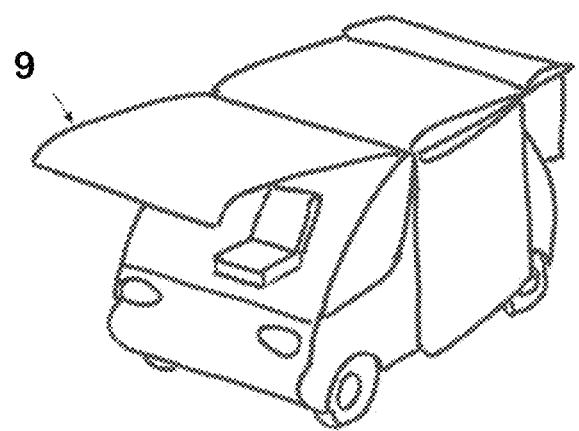
FIG. 17 is a view like FIG. 1, showing a passenger entrance door open at the front of the vehicle.

The operator of the flying car/flying drone vehicle can enter the vehicle through a front door 9 (FIG. 17), or through a rear or side access door (not shown).

During land operation, roadable land/amphibious mode, the rotors 20 are stored in the storage compartments 18.

Figure 4:
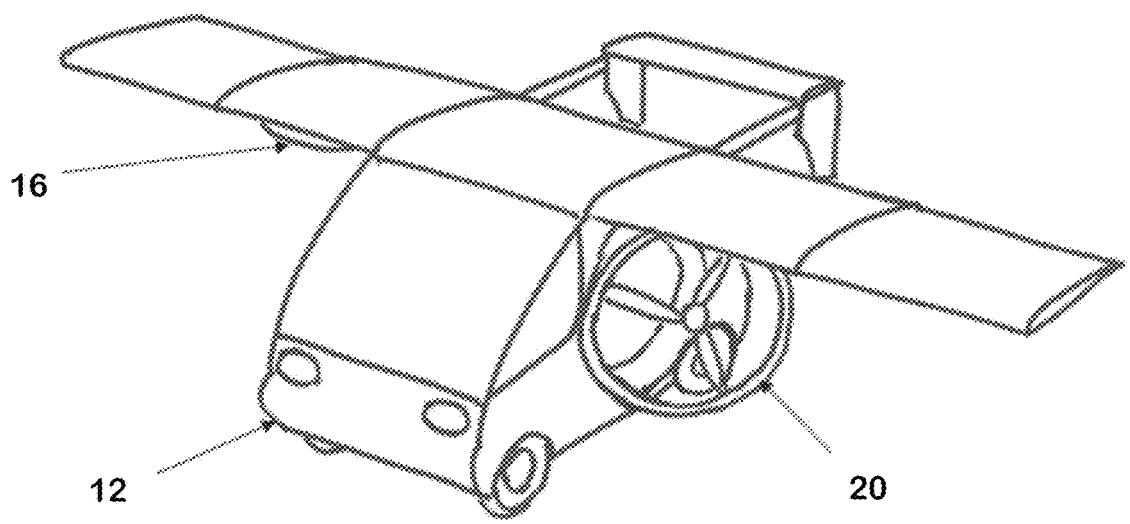
FIG. 4 is a view like FIG. 3, showing one rotor being deployed and the rotor's cover doors being opened.
Figure 5:
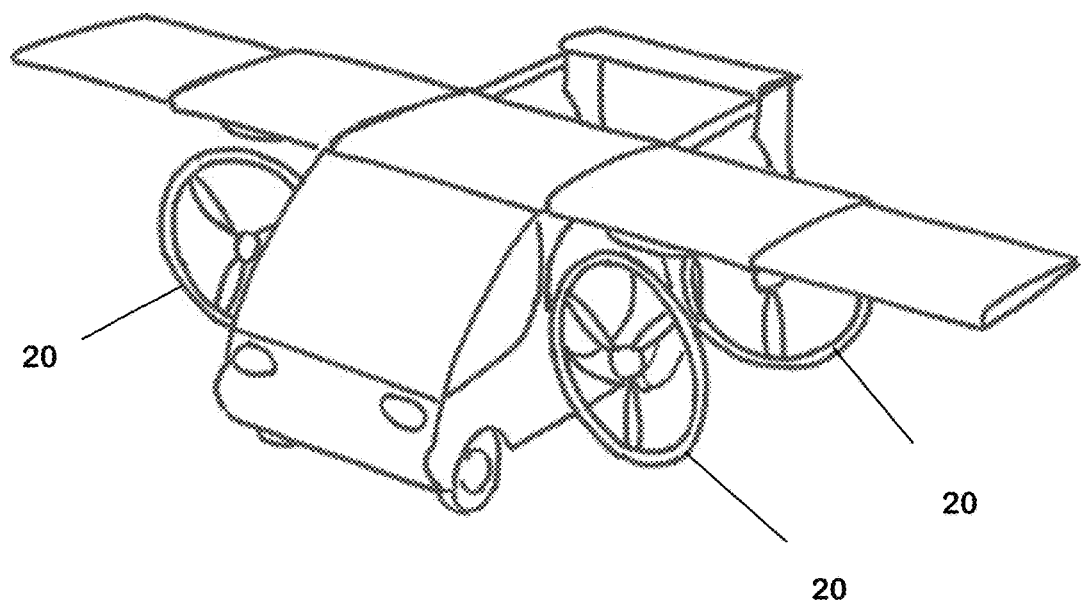
FIG. 5 shows the rotors fully deployed in a vertical orientation and the rotor's cover doors being opened.
Figure 6:
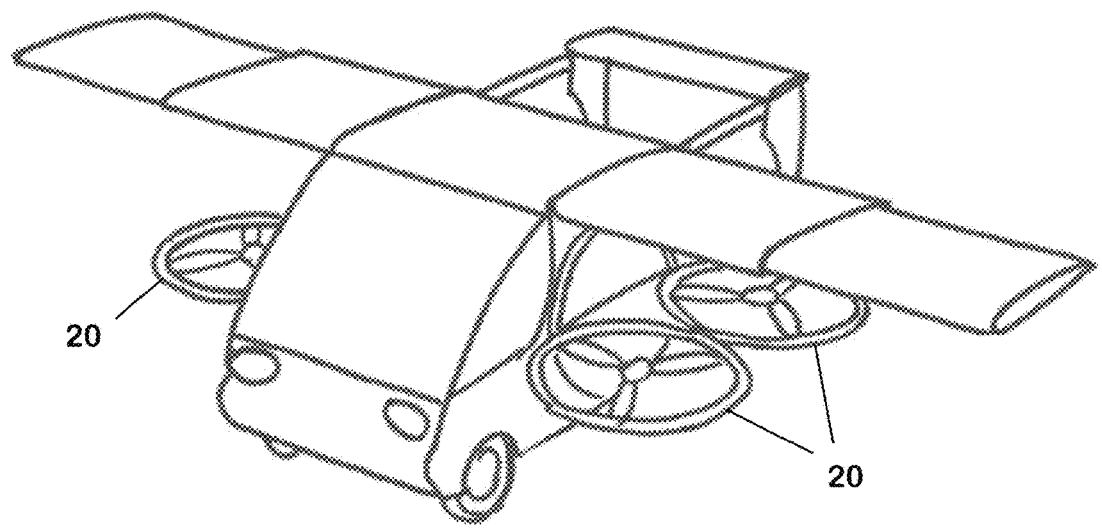
FIG. 6 shows the rotors in a horizontal orientation and the rotor's cover doors being closed.
Figure 7:
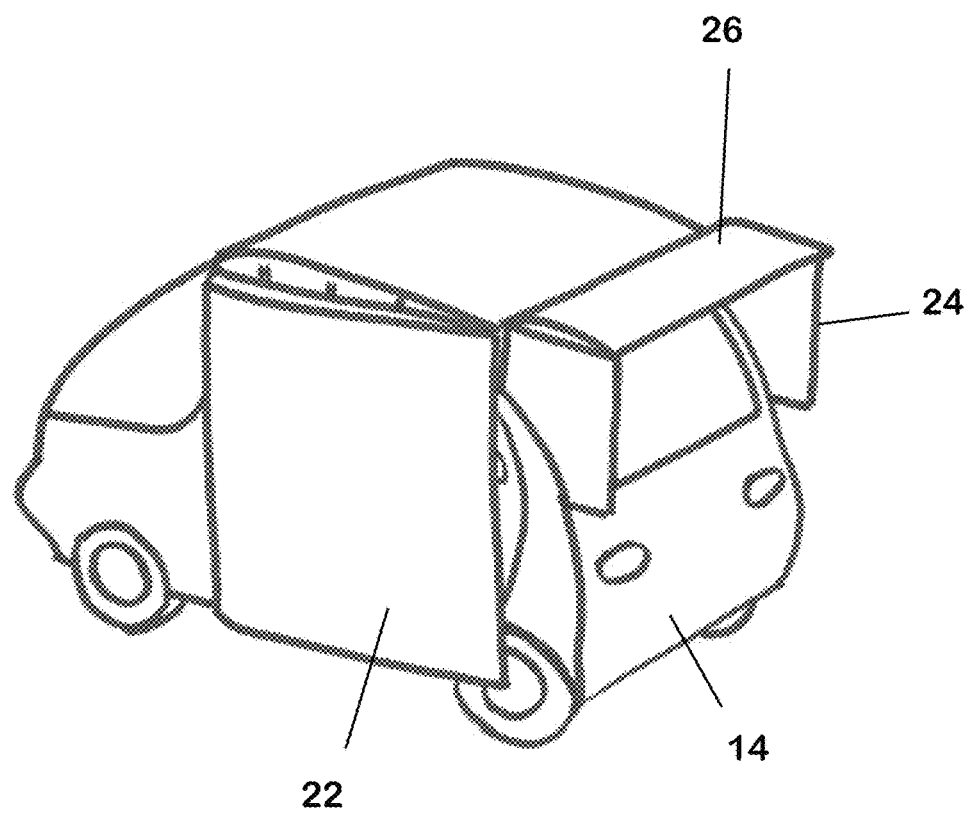
FIGS. 7-12 are similar perspective views, from the rear of the vehicle.
Figure 8:
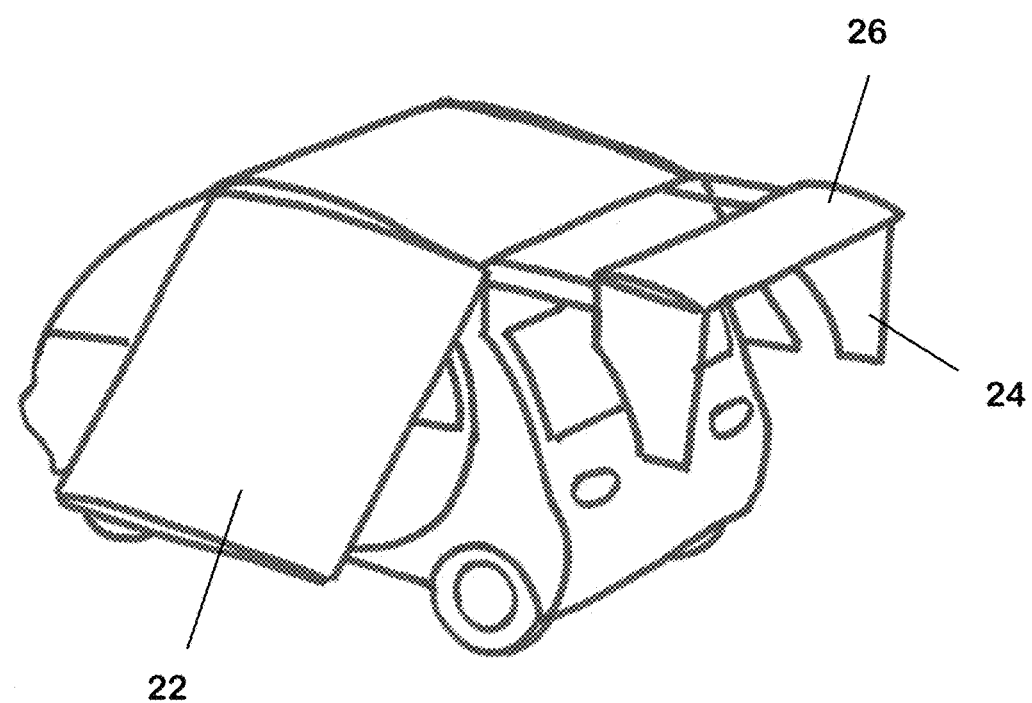
Figure 9:
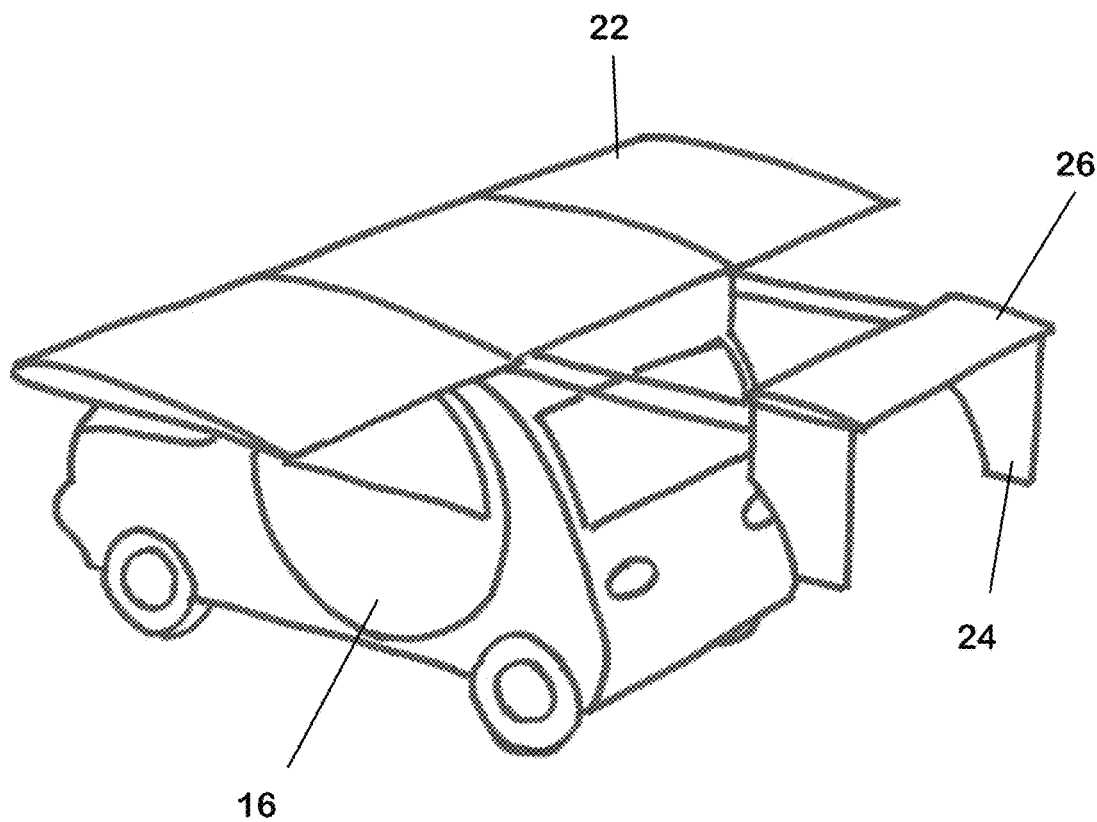
Figure 10:
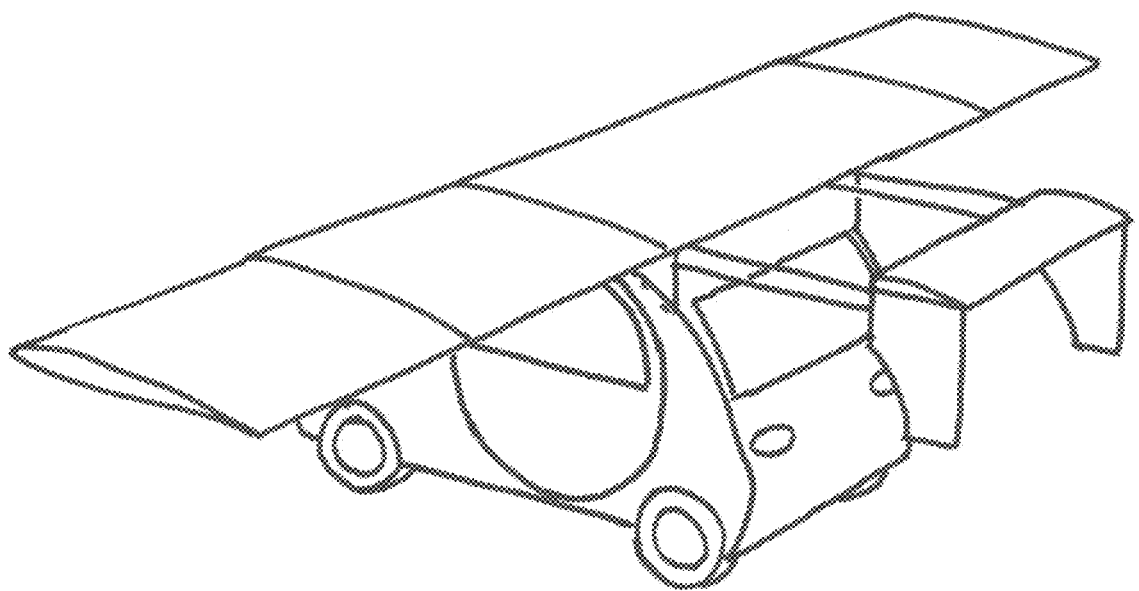
Figure 11:
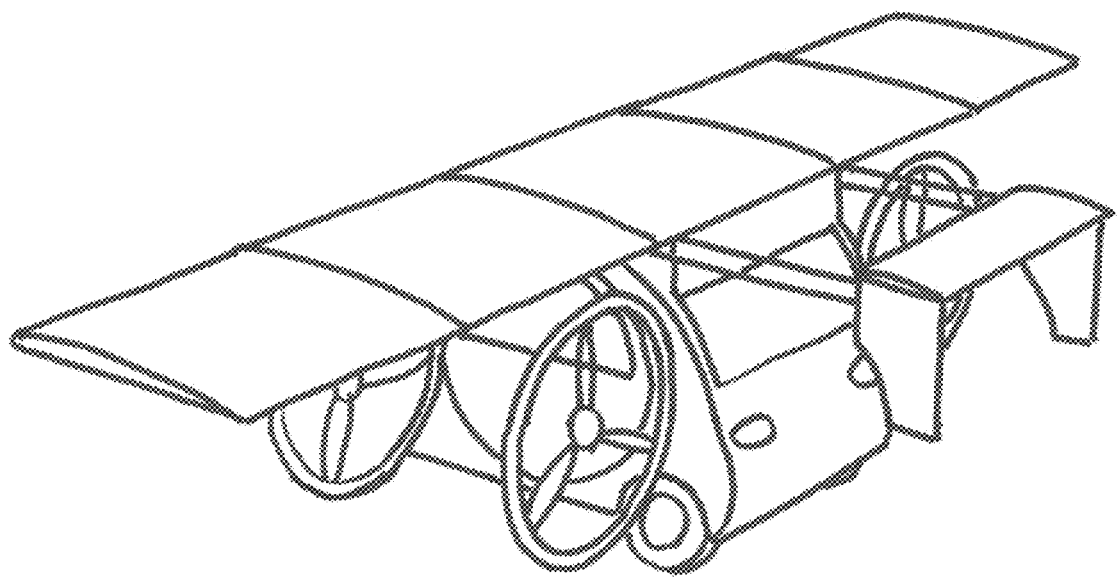
Figure 12:
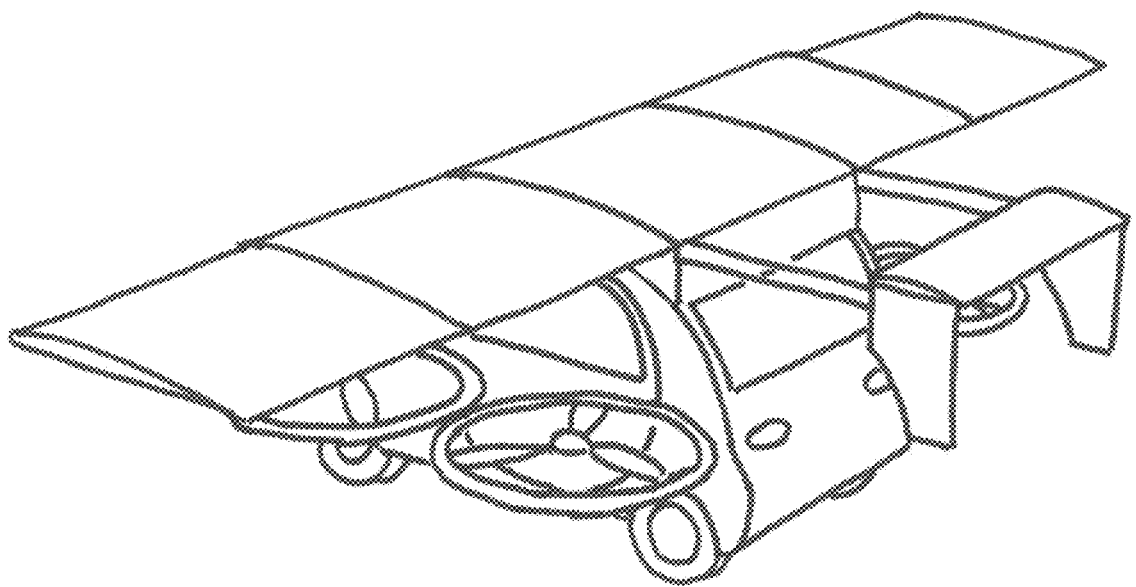

During preparation for take off, in a transition mode, the wings 22 are raised, allowing the rotors 20 to be deployed, as shown in FIGS. 2-6, in an initially close to vertical configuration, as when stored (FIGS. 3-5). After rotors have exited the storage compartments, the side wings remain in their deployed vehicle flight configuration.

Figure 18:
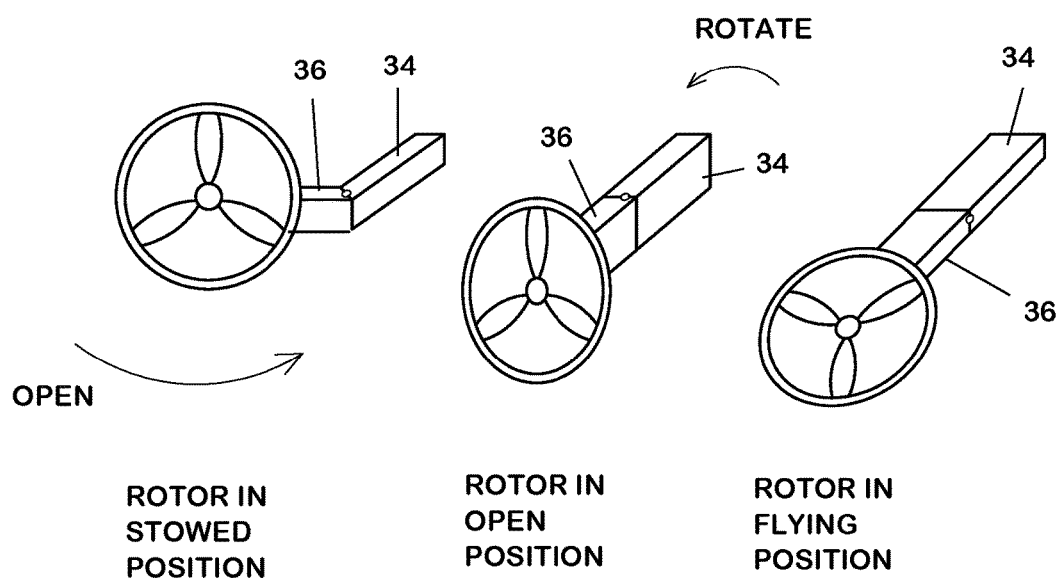
FIG. 18 is an isometric view showing a rotor deployment actuator and rotation mechanism in stowed, open and flying positions.
Figure 19:
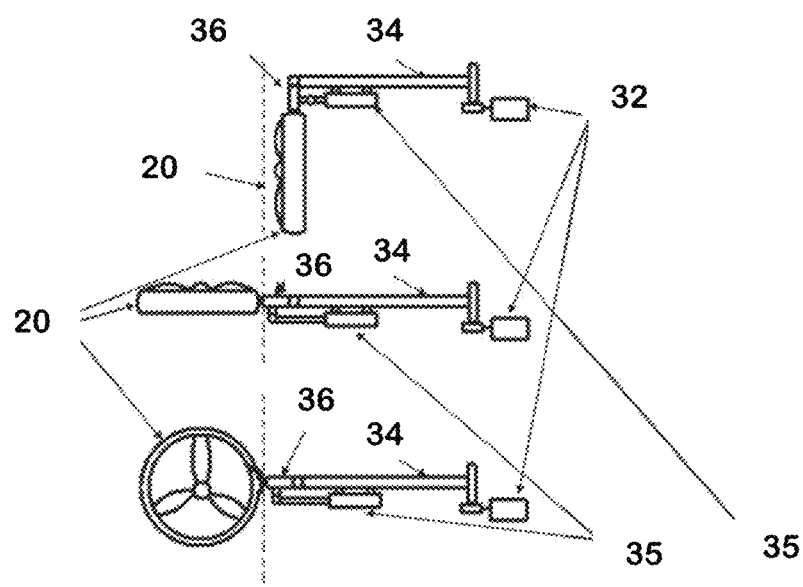
FIG. 19 is a top plan schematic view of the rotors' control mechanism.
Figure 20:
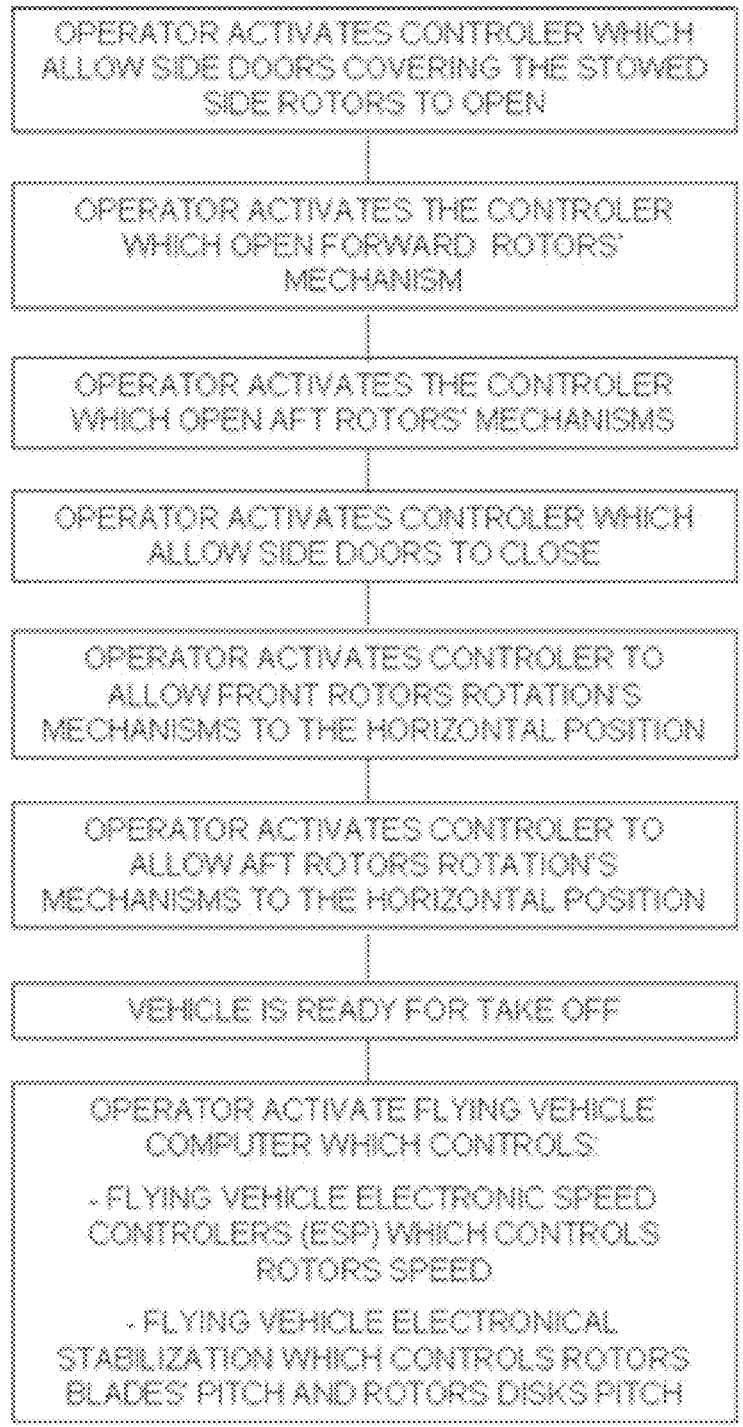
FIG. 20 is a block diagram illustrating controlling the flying vehicle transformation from the roadable/amphibious configuration to the flying configuration.

The rotors are supported by hinged actuators 30 (FIGS. 18-19), which move the stored rotors (initially in a stowed position inside the compartments 18) to a deployed position outside the vehicle body (FIG. 5). The actuator comprises an electromechanism 32, 35 which rotates the actuator's arms 34, 36 through 90° to move the rotors 20 from their initial open position to a flying position (FIG. 5).

After the side storage compartment covers are closed completely, the rotors can move to a horizontal orientation (FIG. 6), which is the basic position for Vertical Take-Off and Landing (VTOL).

Figure 16:
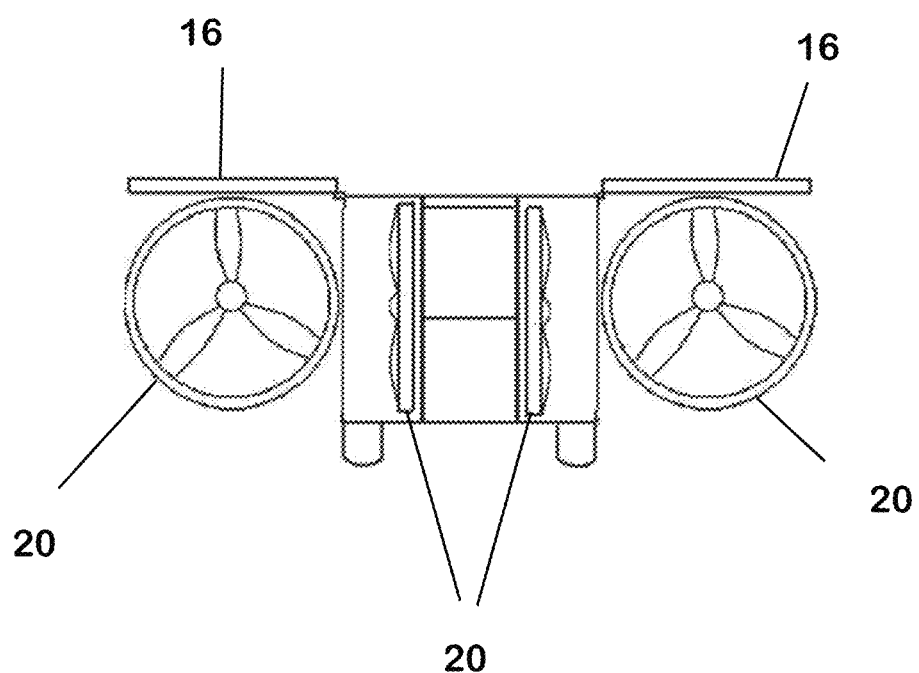
FIG. 16 is a sectional view thereof, taken on the plane 16-16 in FIG. 15, showing two rotors deployed in a vertical position and two rotors undeployed in a vertical position.

During flight, the rotors spin around their rotational axes; the rotors may have blade pitch change capability. The side rotors can rotate around the rotors opening axes, in order to provide high maneuverability (FIG. 16). Also, the rotors' speed and blade pitch can be adjusted based of the vehicle needs. After take-off, the rotors can be moved from horizontal to a vertical position (−90° pitch), in order to create the necessary thrust for the vehicle flight cruise configuration. The rotation of the rotors around the body hinge points, create the transition from the take-off to the cruise configuration.

Figure 14:
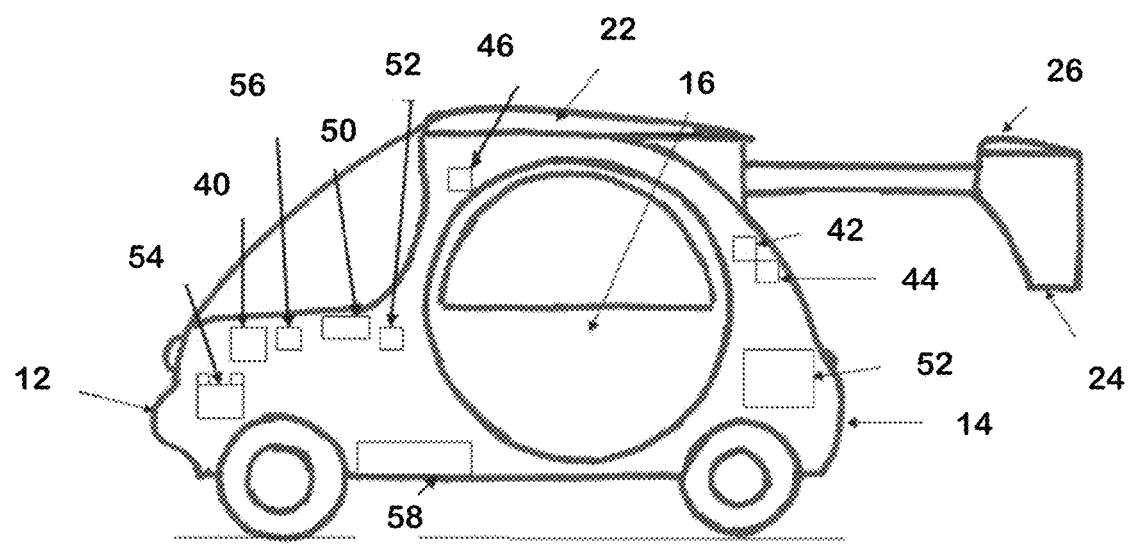
FIG. 14 is a left side elevational view of the vehicle.
Figure 15:
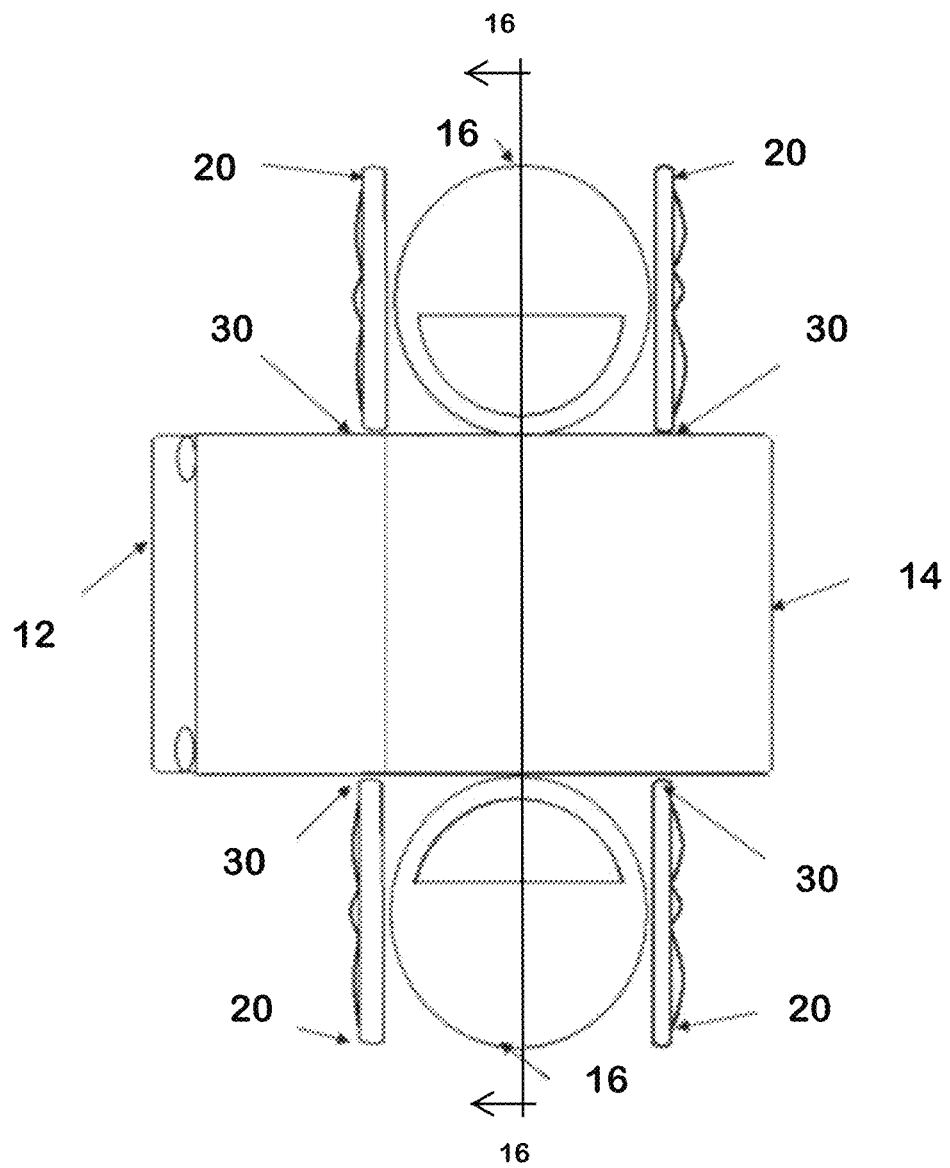
FIG. 15 is a top plan view thereof, showing the rotors fully deployed in a vertical orientation, with the cover compartment doors opened. The wing is removed in this view, for clarity.

The flying vehicle's computer microprocessor 40 (FIG. 14) receives signals from an altimeter 42, motion detectors sensors 44, a global positioning system (GPS) 46, and a gyroscoping type controller 48, which processes the signals coming from gyroscopes 50.

Figure 21:
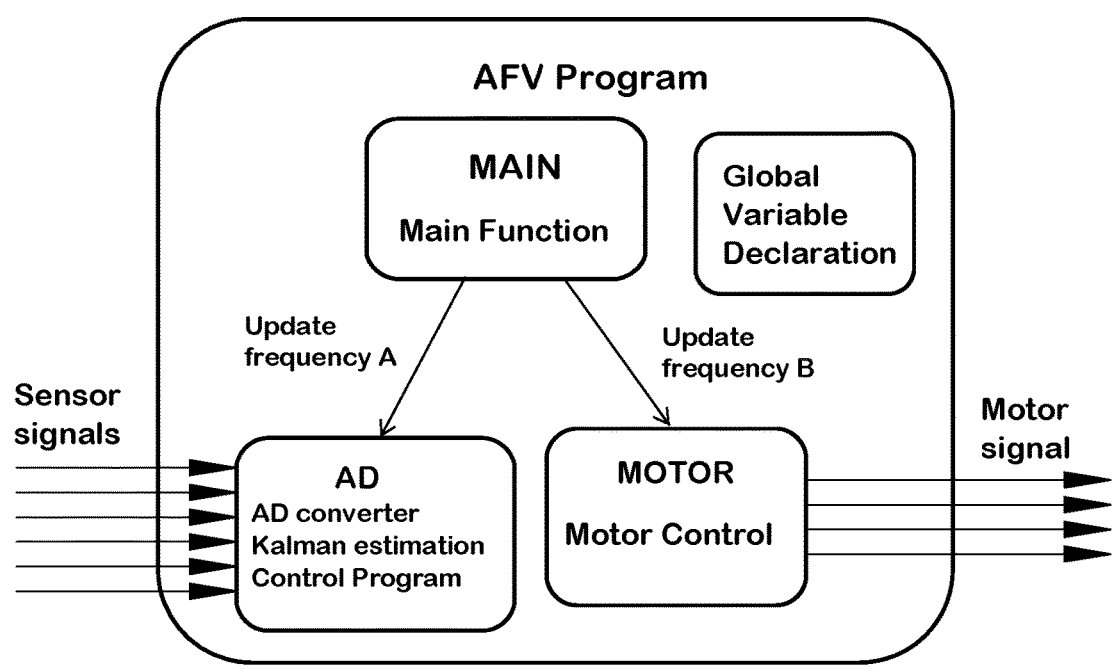
FIG. 21 illustrates Autonomous Flying Vehicle Software (AFVS) program structure.
Figure 22:
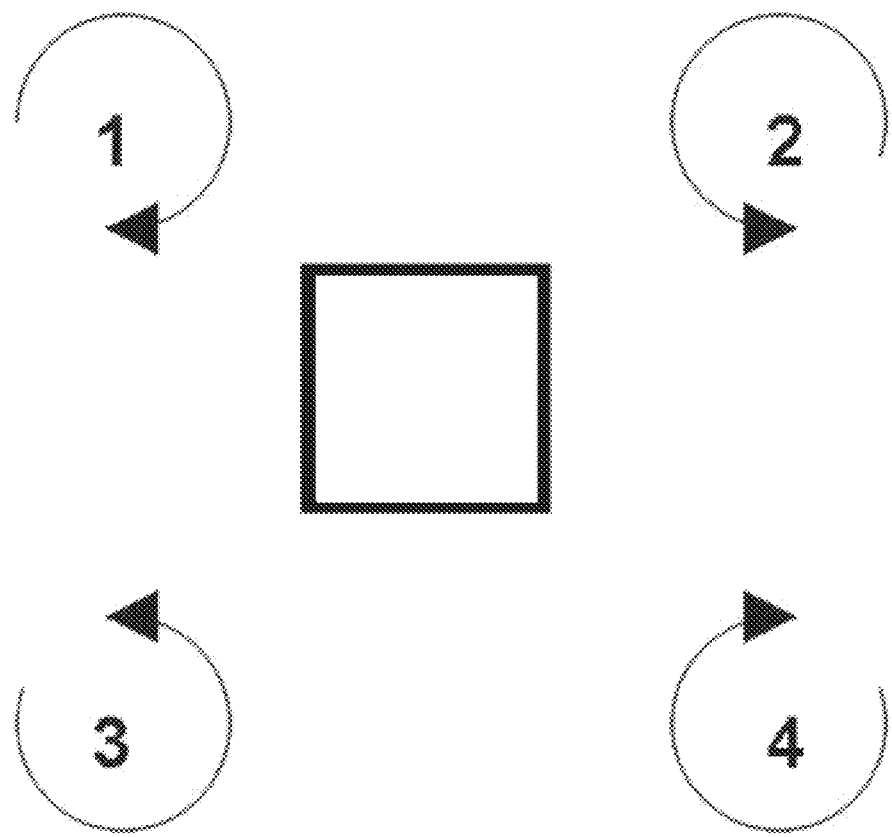
FIG. 22 illustrates the rotors' counterrotating directions.

The processor may use new or existing Autonomous Flying Vehicle Software (AFVS) (FIG. 21) that will assure vehicle complete independent stabilization mode.

The present invention obtains power needed to the move the vehicle on roadways or on water from a power unit, which may be:

a) an internal combustion, diesel or turbofan engine 52 which drive the vehicle's wheels through shafts, pinions and gears, b) an electric power supply, battery 54 or electric generator attached to a combustion, diesel, turboprop or turbofan engine, which provide the necessary electrical energy to drive the vehicle electric motors connected to vehicle wheels, or c) an air power supply 56, air from an air compressor attached to a combustion, diesel or turbofan engine, air from a turbofan engine or air from an air reservoir 58, to create the necessary energy to drive the vehicle wheels through a central or independent air motor on each of the vehicle's wheels.

Similarly, power needed to rotate the rotors is provided by:

i) an internal combustion, diesel or turbofan engine which drive the rotors through shafts, pinions and gears, ii) an electric power supply, battery or electric generator attached to a combustion, diesel, turboprop or turbofan engine, which provide the necessary electrical energy to drive the rotors' electric motors, and/or iii) an air power supply, air from an air compressor attached to a combustion, diesel or turbofan engine, air from a turbofan engine or air from an air reservoir, to create the necessary energy to drive each of the vehicle rotors through a central or through independent air driven motor for each of the vehicle rotor, or to drive each of the vehicle rotors through a central turbine or through independent turbine for each of the vehicle rotor.

Figure 13:
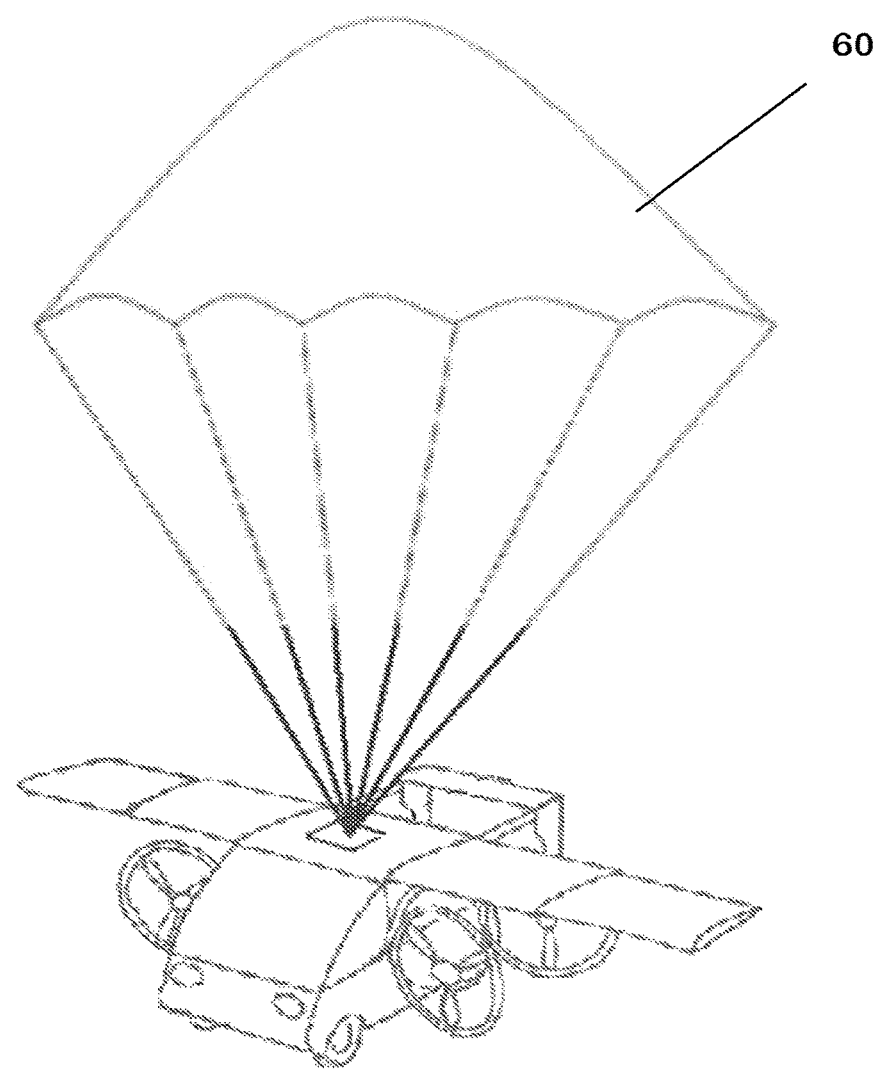
FIG. 13 illustrates an emergency parachute deployed from the vehicle.

For emergency situations, the flying vehicle has benefit of the optional use of the manual or automatically deployed parachute 60 (FIG. 13) for land or water landing.

The roadable land/amphibious configuration of the described flying vehicle is similar to an automobile in that it has multiple rotors packed in a very convenient and compact way.

The general shape of the described present invention, during ground or water operations, having the rotors packed in a very convenient and compact way inside the flying car/flying drone vehicle body and covered by wings, is similar with a car vehicle configuration. For the flying configuration of the described present invention, the unfolded and rotated rotors allow the vehicle to fly in the similar manner of a VTOL/STOL helicopter or airplane.

The flying configuration of the described flying car/flying drone vehicle has the rotors unfolded and rotated in a horizontal or up to vertical position relatively to ground that allow the vehicle to fly in the similar manner of a VTOL/STOL helicopter or airplane.

For the roadable land/amphibious configuration, the vehicle has conventional pedals, controls and steering mechanism so it can be driven like a car. For flying configuration, the flying car/flying drone vehicle has a control stick (not shown) which is used in the flight mode.

In order to transform to the flight configuration, the vehicle raises the side wings, thus uncovering the compact stored rotors, unfolds the rotors, rotates the rotors from their stored vertical position into a flying horizontal take off position, and starts spinning the rotors in order to create the necessary lift for the vehicle to take off, fly and land. During cruise configuration, the rotors may be pivoted to a vertical position, to create thrust for the vehicle in flight mode.

The vehicle cabin, when closed, is hermetically sealed and can be pressurized.

The foregoing description is of a presently preferred embodiment of the invention; however, modifications of the vehicle will occur to those in the field of this invention.

In particular, where single-propeller rotors are shown and described above, one might substitute multiple propellers. For example, a hexagonal array of seven coplanar smaller propellers, within the same diameter as the single propeller rotors described above, might prove to be as good as or better than a single propeller, in terms of weight, lift and efficiency.

Since the invention is subject to modifications and variations, it is intended that the foregoing description and the accompanying drawings shall be interpreted as only illustrative of the invention.

What is claimed is:

1. A vehicle having roadable and flying modes, said vehicle comprising
    a body,
    powered wheels for providing propulsion on land, a plurality of rotors for providing propulsion in air,
    a plurality of wings for providing lift in air,
    said body having storage compartment for said rotors,
    said rotors being movable between a stowed position inside compartments, and a deployed position outside compartments,
    said plurality of wings being movable between the stowed position against said body and covering said storage compartments, and the deployed position away from said body, and
    a plurality of storage compartment covers, one for each of said storage compartments, to conceal the rotors in the roadable mode.

2. The vehicle of claim 1, wherein there are two said storage compartments, one on either side of the vehicle, and four rotors, two on either side of the vehicle, said compartments each housing two rotors when in the stowed position.

3. The vehicle of claim 1, further comprising a power unit for driving said wheels, and a power unit for driving said rotors.

4. The vehicle of claim 1, wherein each of the rotors is supported on the body by an actuator mechanism having arms which allow the rotors to move between said stowed and deployed positions, and to rotate between horizontal and vertical orientations when in the deployed position.

* * * * *